US012659387B2

(12) United States Patent
Guerra et al.

(10) Patent No.: US 12,659,387 B2
(45) Date of Patent: Jun. 16, 2026

(54) WEBSOCKET REGION SHIFTING

(71) Applicant: Netflix, Inc., Los Gatos, CA (US)

(72) Inventors: Justin Robert Guerra, Boulder, CO (US); Arthur Gonigberg, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 71 days.

(21) Appl. No.: 18/913,313

(22) Filed: Oct. 11, 2024

(65) Prior Publication Data

US 2026/0106922 A1     Apr. 16, 2026

(51) Int. Cl.
H04L 69/16 (2022.01)
H04L 67/02 (2022.01)
(52) U.S. Cl.
CPC ............ H04L 69/162 (2013.01); H04L 67/02 (2013.01)
(58) Field of Classification Search
CPC .............................. H04L 69/162; H04L 67/02
See application file for complete search history.

(56) References Cited

U.S. PATENT DOCUMENTS

| | | | |
|---|---|---|---|
| 2003/0172155 A1* | 9/2003 | Kim ........................ | G06F 21/31 |
| | | | 709/224 |
| 2016/0337424 A1* | 11/2016 | Mandyam ............ | H04N 21/643 |
| 2022/0121426 A1* | 4/2022 | Burgmeier ............... | G06F 8/33 |

* cited by examiner

*Primary Examiner* — Anh Nguyen
(74) *Attorney, Agent, or Firm* — Hogan Lovells US LLP

(57) ABSTRACT

A computer-implemented method includes listening for an evacuation event indicating that network traffic for a designated geographical region is to be transferred to various other geographical regions. The method also includes identifying open web socket connections assigned to the designated geographical region and determining that the open web socket connections are to be disconnected and transferred to a specific geographical region among the other geographical regions. The method further includes scheduling, in a disconnection schedule, the open web socket connections for disconnection within a specified time interval and, after a specified amount of time designated by the disconnection schedule, closing the open web socket connections in the designated geographical region and reopening the web socket connection in the specified geographical region. Various other methods, systems, and computer-readable media are also disclosed.

20 Claims, 7 Drawing Sheets

200

| 210 | Listen for evacuation event |
| 220 | Identify open web socket connections |
| 230 | Determine disconnections and transfers |
| 240 | Schedule web socket connections for disconnection |
| 250 | Close and reopen connections in new region |

300

Time Interval 310

Region A Data Center

301

Web Socket Connection 302 — T1

Connection 303 — T2

Connection 304 — T3

Connection 305 — T4

400

401

75% Scheduled for Disconnection

Region A
Data Center

402
Web Socket
Connections

500

501

**Region A
Datacenter**

502
Outdated
DNS

503

Proxy
Server

504

505

Region B
Datacenter

507
Updated
DNS

506

601

602

| IP Address A | Server Instance C |
|---|---|
| IP Address B | Server Instance A |
| IP Address C | Server Instance E |
| IP Address D | Server Instance A |

WEBSOCKET REGION SHIFTING

BACKGROUND

Media streaming servers often connect with electronic client devices using hypertext transfer protocol (HTTP) connections. These network connections are typically stateless and short-lived. As such, the HTTP connections are quickly formed and, if dropped, are simply reestablished without any deference to the prior connection. HTTP connections typically last between 100 ms to one second. Web socket connections, on the other hand, are stateful and are, thus, designed to maintain information related to the state of the connection. Moreover, web socket connections are designed to last much longer than HTTP connections (e.g., one to two hours or more). In some cases, connections between the media streaming servers and the client devices need to be moved from one region to another. In such cases, the management of web socket connections may be different than that of HTTP or other short-lived connections.

SUMMARY

As will be described in greater detail below, the present disclosure generally describes systems and methods for seamlessly transferring web socket connections from one geographical region to a different region.

In one example, a computer-implemented method is provided for seamlessly transferring web socket connections from one geographical region to a different region. The method includes listening for an evacuation event indicating that network traffic for a designated geographical region is to be transferred to another region. The method then includes identifying various open web socket connections assigned to the specified geographical region and determining, for one or more of the open web socket connections, that the open web socket connections are to be disconnected and transferred to a specified geographical region among the other geographical regions. Then, for those web socket connections that are to be transferred to one of the other geographical regions, the method includes scheduling, in a disconnection schedule, the open web socket connections for disconnection within a specified time interval, and after a specified amount of time designated by the disconnection schedule, closing the open web socket connections in the designated geographical region and reopening the web socket connection in the specified geographical region.

According to another aspect, the method includes scheduling the open web socket connections for disconnection within a specified time interval by applying a random jitter that closes the open web socket connections after a randomly selected amount of time that is within the specified time interval. In some cases, the method includes determining that the open web socket connections are to be disconnected and transferred to a specified geographical region among the other geographical regions by determining a specified percentage of open web socket connections that are to be transferred. In some embodiments, the open web socket connections that are to be transferred to one of the other geographical regions include web socket connections that are part of the specified percentage.

In some cases, the web socket connections that are to be transferred to one of the other geographical regions are assigned to the other geographical regions to maximize latency and/or load balancing among the other geographical regions. In some embodiments, the method includes the web socket connection reconnecting to the designated geographical region and being proxied to one of the other geographical regions. In some examples, the method includes domain name system (DNS) names for the specified geographical region being updated while the web socket connections are being proxied.

In some embodiments, when web socket connections reconnect to the specified geographical region, the web socket connections are redirected to one of the other geographical regions without being proxied. In some cases, the method includes identifying the open web socket connections assigned to the specified geographical region by walking through a table of web socket connections that links IP addresses and web server instances. In some examples, the method includes closing the open web socket connections in the designated geographical region by closing the open web socket connections with a server-to-client handshake.

In some cases, the method includes, as part of the server-to-client handshake, sending a formatted text frame to the client device, wherein the formatted text frame initiates a request to receive a control frame from the server. In some embodiments, the method includes, based on the request, sending a control frame that causes the client to close the open web socket connection. In some examples, the method includes web socket connections failing over to hypertext transfer protocol (HTTP) if the web socket connection fails. In some cases, the method includes at least one of the web socket connections being restored to the designated geographical region. In some embodiments, the open web socket connections are open for at least one hour.

A corresponding system includes at least one physical processor and physical memory including computer-executable instructions that, when executed by the physical processor, cause the physical processor to: listen for an evacuation event indicating that network traffic for a designated geographical region is to be transferred to one or more other geographical regions, identify one or more open web socket connections assigned to the specified geographical region, determine, for one or more of the open web socket connections, that the open web socket connections are to be disconnected and transferred to a specified geographical region among the one or more other geographical regions, for those web socket connections that are to be transferred to one of the other geographical regions, schedule, in a disconnection schedule, the open web socket connections for disconnection within a specified time interval, and after a specified amount of time designated by the disconnection schedule, close the open web socket connections in the designated geographical region and reopening the web socket connection in the specified geographical region.

In some examples, a corresponding non-transitory computer-readable medium is provided that includes one or more computer-executable instructions that, when executed by at least one processor of a computing device, cause the computing device to: listen for an evacuation event indicating that network traffic for a designated geographical region is to be transferred to one or more other geographical regions, identify one or more open web socket connections assigned to the specified geographical region, determine, for one or more of the open web socket connections, that the open web socket connections are to be disconnected and transferred to a specified geographical region among the one or more other geographical regions, for those web socket connections that are to be transferred to one of the other geographical regions, schedule, in a disconnection schedule, the open web socket connections for disconnection within a specified time interval, and after a specified amount of time designated by the disconnection schedule, close the open web socket connections in the designated geographical region and reopening the web socket connection in the specified geographical region.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 6 illustrates an embodiment in which IP addresses are mapped to different server instances.

Figure 1:
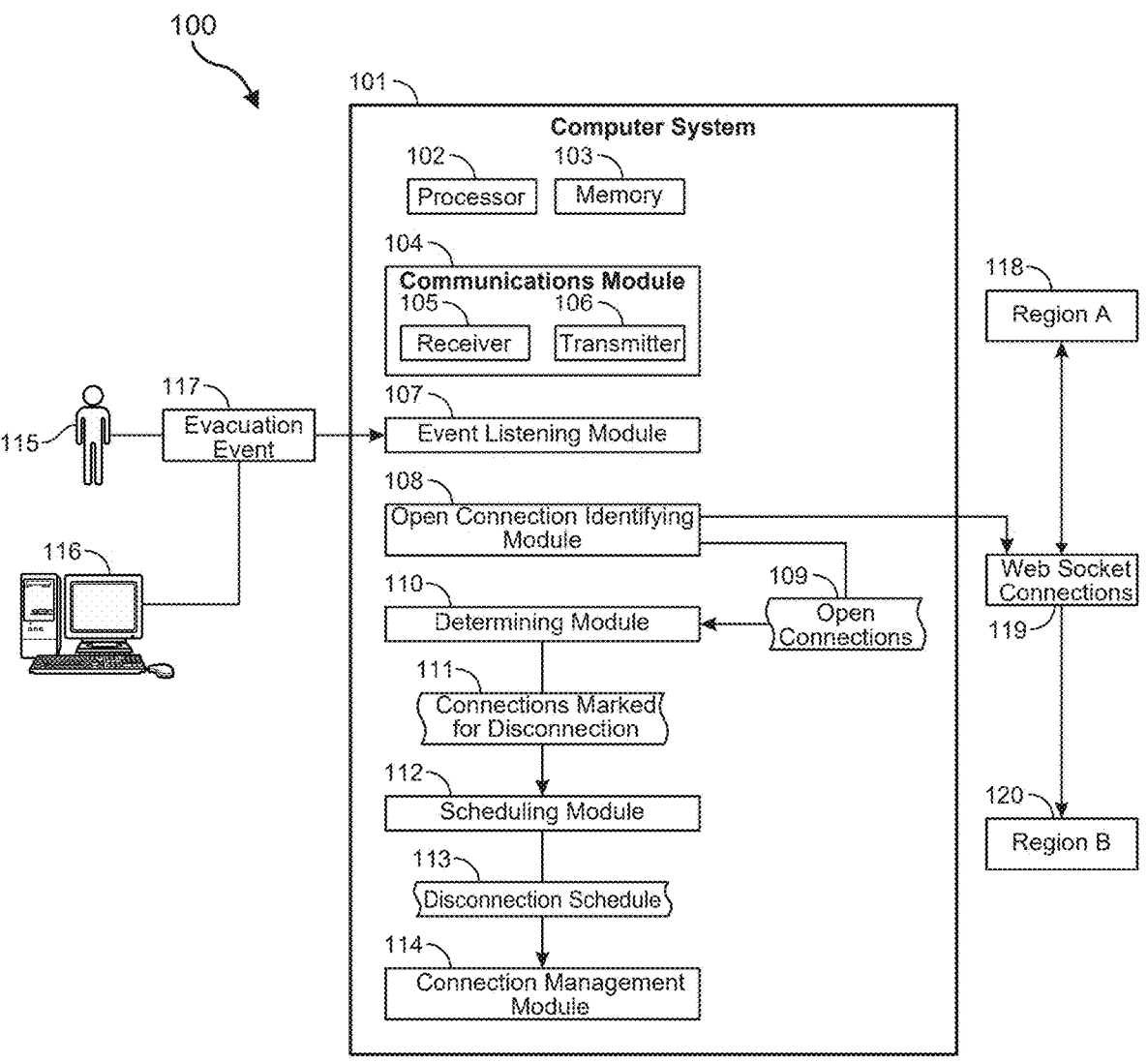
FIG. 1 illustrates an example computer architecture in which the embodiments described herein may operate.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to seamlessly transferring web socket connections from one geographical region to a different region. As noted above, media streaming servers often connect with client devices using hypertext transfer protocol (HTTP) connections. These connections are typically stateless and short-lived, lasting between 100 ms to one second. As such, the HTTP connections are quickly formed and, if dropped, are simply reestablished without any deference to the prior connection.

Web socket connections, on the other hand, are stateful and are designed to maintain information related to the state of the connection. Web socket connections are also designed to last much longer than HTTP connections, often ranging from one to two hours or more. In some cases, connections between media streaming servers and the respective client devices need to be moved from one region to another region. For instance, if the media streaming servers are experiencing processing hardware issues or network issues, the web socket connections to the servers will need to be moved to another region. The management of web socket connections in such scenarios presents challenges compared to HTTP or other short-lived connections.

Traditional solutions for managing client connections during regional transfers often involve abrupt disconnections and reconnections, leading to potential service interruptions and degraded user experiences. These methods do not account for the stateful nature of web socket connections, resulting in loss of session data and requiring users to re-establish their connections manually. Additionally, existing approaches may not efficiently handle load balancing and latency optimization when redistributing connections across different geographical regions. This can lead to uneven distribution of network traffic and suboptimal performance.

The present disclosure, in contrast, describes systems and methods for seamlessly transferring web socket connections from one geographical region to another region. The disclosed methods listen for evacuation events which indicate that network traffic for a designated geographical region is to be transferred to servers of another geographical region. The systems and methods then identify various open web socket connections assigned to the specified geographical region and determine, for each of the open web socket connections, whether the open web socket connections are to be disconnected and transferred to a specific geographical region. For those web socket connections that are to be transferred, the methods disclosed herein schedule the open web socket connections for disconnection within a specified time interval and, after the designated amount of time, close the open web socket connections in the designated geographical region and reopen the web socket connection in a specified geographical region. These processes will be described in greater detail below with reference to FIGS. 1-9.

FIG. 1, for example, illustrates a computing environment 100 in which web socket connections are transferred from one geographical region to a different region. FIG. 1 includes various electronic components and elements including a computer system 101 that is used, alone or in combination with other computer systems, to perform associated tasks. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

In some cases, the communications module 104 is configured to communicate with other computer systems. The communications module 104 includes substantially any wired or wireless communication means that can receive and/or transmit data to or from other computer systems. These communication means include, for example, hardware radios such as a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded computing systems, or other types of computing systems.

The computer system 101 further includes an event listening module 107. The event listening module 107 is configured to listen for evacuation events indicating that network traffic for a designated geographical region is to be transferred to another geographical region. The evacuation events 117 may include substantially any type of indication that client-server connections are to be transferred to another server or group of servers. The evacuation events 117 may arise for a variety of reasons, including processing load, processing failure, excessive network load or network failure, power outages, or other reasons. Regardless of how the evacuation event 117 originates, the event listening module 107 of computer system 101 is designed to continuously monitor for such events and then trigger subsequent actions when an evacuation event is detected.

The open connection identifying module 108 is responsible for identifying the open web socket connections 109 that are assigned to a specific geographical region. Each region (e.g., 118, 120, or others) includes one or more servers or server instances. Within this disclosure, indications or descriptions of transferring connections from one region to another region include transferring connections from servers in one region to servers in another region. These regions may be physically separate (e.g., U.S West or U.S. East or Europe or different cities in a state or different buildings on a campus, etc.) In some cases, connections are transferred to other servers in the same region or are transferred to different logical instances of a server running on the same hardware. The open connection identifying module 108 scans through the active, open connections 109 and marks those that are currently open and associated with the region that is subject to the evacuation event (e.g., Region A 118).

The open connections 109 represent the active web socket connections that are currently established and maintained by the computer system 101. These connections are stateful and are designed to last for extended periods (e.g., from one to two hours or more). The determining module 110 determines, for one or more of the open web socket connections 109, that the open web socket connections are to be disconnected and transferred to a specific geographical region (e.g., region B 120) among the other geographical regions. At least in some cases, the determining module 110 uses predefined criteria to determine which connections need to be transferred based on factors such as load balancing and latency optimization.

The connections marked for disconnection 111 are those connections that the determining module 110 has identified as needing to be disconnected and transferred to another geographical region (e.g., region B). These connections are flagged for subsequent disconnection and transfer. The scheduling module 112 of computer system 101 then schedules, in a disconnection schedule 113, the open web socket connections for disconnection within a specified time interval. The disconnection schedule 113 is a timetable that outlines when each of the connections marked for disconnection 111 will be closed. The schedule is designed to distribute the disconnections over a specified time interval to minimize disruption. At least in some embodiments, the scheduling module 112 ensures that the disconnections are staggered over a period to avoid a sudden drop in connections and to maintain service continuity.

The connection management module 114 manages the process of disconnecting and reconnecting the web socket connections 119. The connection management module 114 ensures that the connections are closed in the designated geographical region (e.g., region A 118) and reopened in the specified geographical region (e.g., region B 120) according to the disconnection schedule 113. The evacuation event 117 is the trigger that initiates the process of transferring network traffic from one geographical region to another. The evacuation event 117 may be created by a user 115 such as an administrator or may be generated automatically by a computing system 116 such as monitoring system. These concepts will be described in greater detail with respect to method 200 of FIG. 2 and FIGS. 1-9 below.

Figure 2:
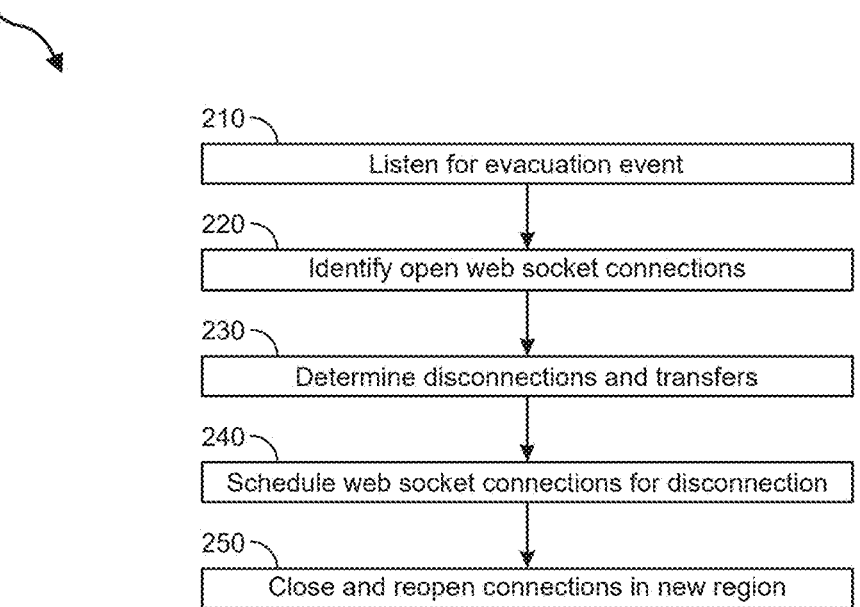
FIG. 2 illustrates a flow diagram of an exemplary method for seamlessly transferring web socket connections from one geographical region to a different region.

FIG. 2 is a flow diagram of an exemplary computer-implemented method 200 for seamlessly transferring web socket connections from one geographical region to a different region. The steps shown in FIG. 2 may be performed by any suitable computer-executable code and/or computing system, including the systems illustrated in FIG. 1. In one example, each of the steps shown in FIG. 2 may represent an algorithm whose structure includes and/or is represented by multiple sub-steps, examples of which will be provided in greater detail below.

Method 200 includes, at 210, a step for listening for an evacuation event indicating that network traffic for a designated geographical region is to be transferred to one or more other geographical regions. At step 220, the method includes identifying one or more open web socket connections assigned to the designated geographical region. At step 230, the method 200 includes determining, for one or more of the open web socket connections, that the open web socket connections are to be disconnected and transferred to a specified geographical region among the one or more other geographical regions. At step 240, the method 200 includes scheduling, for those web socket connections that are to be transferred to one of the other geographical regions, in a disconnection schedule, the open web socket connections for disconnection within a specified time interval. And, at step 250, method 200 includes closing, after a specified amount of time designated by the disconnection schedule, the open web socket connections in the designated geographical region and reopening the web socket connection in the specified geographical region.

Figure 3:
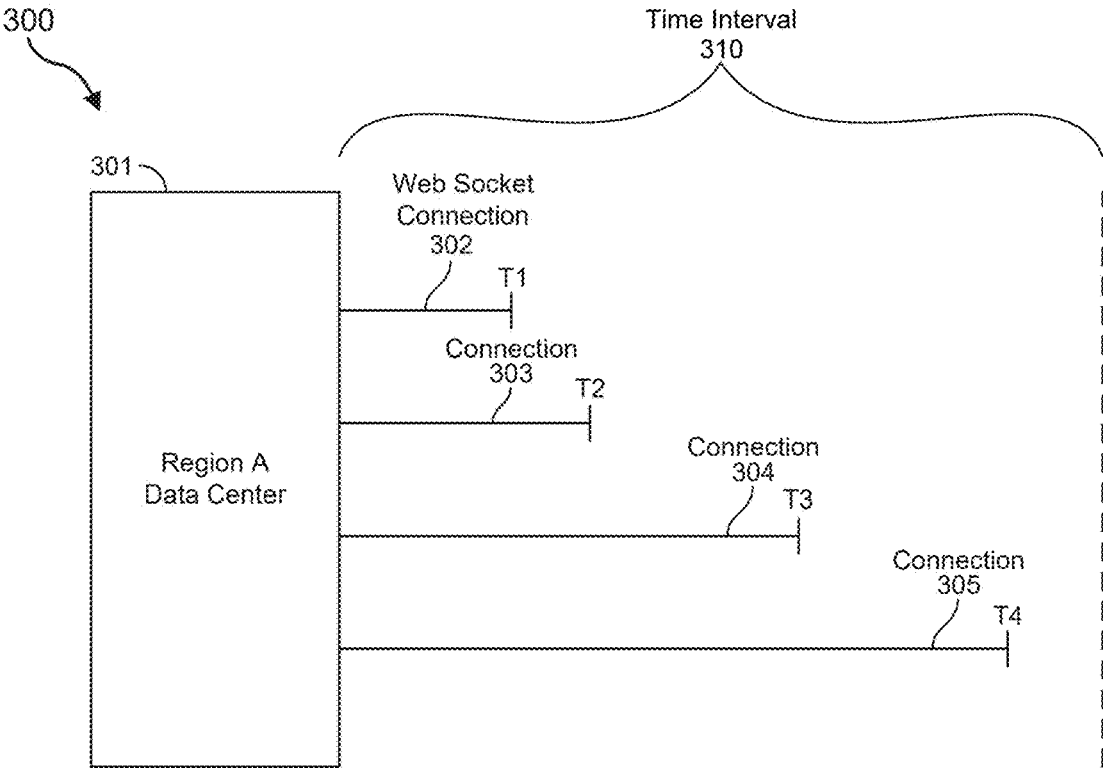
FIG. 3 illustrates an embodiment in which web socket connections are transferred in a staggered manner at different times.

FIG. 3 illustrates an embodiment 300 in which web socket connections 302-305 are transferred in a staggered manner at different times. The staggered transfer mechanism involves scheduling the disconnection of open web socket connections over a specified time interval to minimize disruption. The scheduling module 112 of computer system 101 ensures that the disconnections are staggered over a period to avoid a sudden drop in connections and to maintain service continuity. For example, the region A data center 301 may include multiple different connections. Although web socket connections 302, 303, 304, and 305 are shown, it will be recognized that substantially any number of client devices may form web socket, HTTP, or other connections to the region A data center 301. The client-server connections shown in FIG. 3 are web socket connections that maintain state over a longer period of time.

Once a determination has been made that an evacuation event is to occur, instead of disconnecting all of the web socket connections 302-305 instantly or simultaneously, the embodiments herein are configured to calculate a time interval 310 over which the web socket connections will be transferred to another data center. As noted above, the scheduling module 112 creates a disconnection schedule 113 for the web socket connections. The disconnection schedule is a timetable that outlines when each of the connections marked for disconnection (e.g., 302-305) will be closed and transferred to another data center.

Thus, in FIG. 3, and according to the timetable in the disconnection schedule, web socket connection 302 will be closed and transferred at time T1, connection 303 will be closed and transferred at time T2, connection 304 will be closed and transferred at time T3, and connection 305 will be closed and transferred at time T4. In this manner, each of the open connections is closed within the time interval 310, but at different times within the interval. This ensures that the receiving data centers that will receive the new web socket connections 302-305 will have time to process and handle the incoming connections. This avoids large numbers of simultaneous reconnections that could be interpreted as or could function as an unintended denial of service attack.

At least in some embodiment, the scheduling module 112 of computer system 101 applies a random jitter that closes the open web socket connections after a randomly selected amount of time that is within the specified time interval. The randomly selected amount of time may include any time within the calculated time interval 310. The random selection may occur within some parameters or constraints. For example, the random selection may include at least a minimum amount of time between disconnections. For instance, the randomly selected time amount may include 0.01 seconds between disconnections, 0.1 seconds, 0.2 seconds, 0.5 seconds, 1 second, or some other minimum amount of time between disconnections. The jitter or inserted randomness ensures that the disconnections happen at different times over the time interval 310. This approach helps in distributing the load evenly across different geographical regions (e.g., specifically, to the receiving region(s)) and prevents network congestion by staggering the reconnections over a longer time interval.

Figures 4, 5:
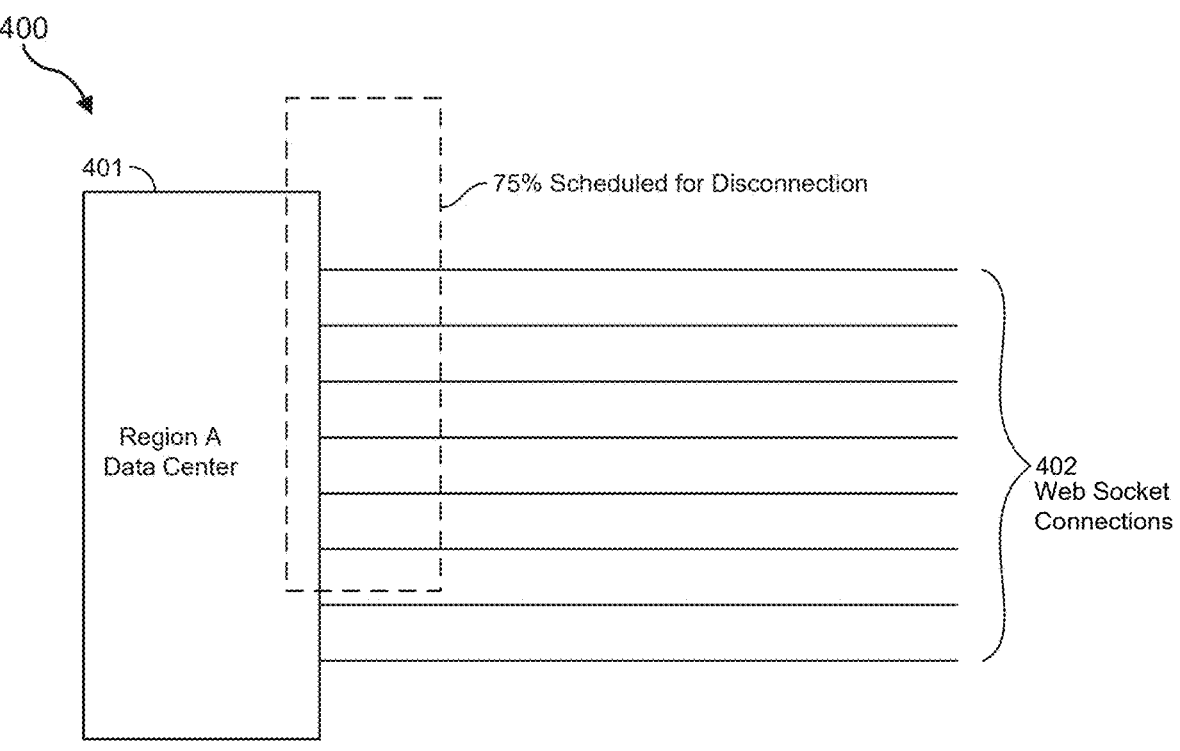
FIG. 4 illustrates an embodiment in which a specified percentage of web socket connections are transferred from one region to another.
FIG. 5 illustrates an embodiment in which new web socket connections are routed using a proxy or updated DNS entry.

FIG. 4 illustrates an embodiment 400 in which a specified percentage of web socket connections are transferred from one region to another. In some embodiments, the determining module 110 of computer system 101 determines a specified percentage of open web socket connections that are to be transferred to another region or another server instance. In FIG. 4, the percentage is 75%. Thus, in this example, 75% of currently open web socket connections 402 in the region A datacenter 401 are to be disconnected and transferred to another region. While 75% is used in this example, it will be recognized that any percentage from 1-100% may be used. In cases where a data center is overloaded, for example, but not malfunctioning, 25-75% of the connections may be disconnected and transferred to another region. In cases where the data center 401 has experienced a power failure or potentially a planned or unplanned system reset, 100% of the web socket connections 402 may be disconnected and transferred. The determined percentage may be case-specific and tailored to the data center's current operating conditions. Thus, the percentage may change dynamically based on how severe the need is to transfer the connections.

Thus, after the determining module 110 of computer system 101 determines a specified percentage of open web socket connections that are to be transferred to another region, the open web socket connections 402 that are to be transferred to another geographical region include those web socket connections that are part of the determined percentage. At least in some cases, the web socket connections 402 that are to be disconnected and transferred are marked for disconnection in the disconnection schedule 113. As noted above, the disconnection schedule 113 schedules the web socket connections 402 for disconnection within a specified time interval. The connection management module 114 manages the process of disconnecting and reconnecting the web socket connections 402, ensuring that the connections are closed in the designated geographical region (e.g., region A data center 401) and reopened in another specified geographical region according to the disconnection schedule 113.

FIG. 5 illustrates an embodiment 500 in which new web socket connections are routed using a proxy or are handled using an updated domain name system (DNS) entry. For instance, if the region A datacenter 501 closes one or more web socket connections or other connections and is in the process of transferring open connections to the region B datacenter 505, the region A datacenter 501 will likely continue to receive new incoming connection requests 503. In such cases, the region A datacenter 501 will initiate an update to the DNS system so that requests that would have been sent to datacenter 501 will be sent to datacenter 505 in region B. Initially, the DNS address 502 will be out of date. During that time frame, while the DNS address 502 is still out of date, a proxy server 504 may route the incoming requests 503 to the region B datacenter 505. This process of proxying the incoming connections 503 to a different datacenter ensures that the system's connections are managed efficiently during the transition to the new datacenter and maintains service continuity while optimizing network performance.

While the incoming web socket connections 503 are being proxied by the proxy server 504, the DNS name for the previous geographical region (e.g., 501) is updated and the updates are promulgated within the system. When web socket connections 506 reconnect to the new geographical region (e.g., datacenter 505), the web socket connections 506 are redirected to the new geographical region without being proxied. Instead of needing to be proxied to the new datacenter, the incoming web socket connections 506 are connected to the new datacenter 505 using the updated DNS address 507.

Thus, at least in some embodiments, web socket connections attempt to reconnect to the initially designated geographical region (e.g., 501) and are proxied to another geographical region. During that time, the DNS name for the specified geographical region is updated while the web socket connections are being proxied. Then, after the DNS name has been updated, the web socket connections are redirected to the new geographical regions without being proxied. This process streamlines the web socket transfer process and reduces the amount of processing and network resources by implementing the proxy only as long as is needed to update the DNS address. Thereafter, the updated DNS address 507 will correctly identify the new datacenter 505 for client-server web socket connections.

In at least some embodiments, a backup mechanism may be provided such that if a web socket connection fails, the system will fail that connection over to a standard hypertext transfer protocol (HTTP) connection. Thus, if a connection to the new region B datacenter 505 fails, the region B datacenter will complete the connection using HTTP. If, at some point, the region A datacenter 501 were to come back online, the web socket connections 503, 506, and/or others will be restored to the initial geographical region. In such cases, the system will disconnect the connections from the region B datacenter 505 and transfer the connections to the region A datacenter 501 in the manner described above.

When the prior datacenter comes online or when a new datacenter comes online, the web socket connections may be assigned for transfer in a manner that maximizes latency and/or load balancing among the other (existing) geographical regions. Thus, if a web socket connection could experience lower latency with a connection to the region A datacenter 501, the web socket connection will be transferred to that datacenter. Additionally or alternatively, if the region B datacenter 505 is overloaded (either on the processing side or the networking side), some percentage of the web socket connections may be transferred to other data centers to reduce load on the region B datacenter.

FIG. 6 illustrates an embodiment in which internet protocol (IP) addresses 601 are mapped to different server instances. In some cases, the open connection identifying module 108 of FIG. 1 identifies a list of open web socket connections assigned to a specific geographical region by walking through a table of web socket connections that links IP addresses and web server instances. For instance, the IP address A (602) is mapped to server instance C, IP address B (603) is mapped to server instance A, IP address C (604) is mapped to server instance E, and IP address D (605) is mapped to server instance A.

Thus, some IP addresses are mapped to different server instances and some IP addresses are mapped to the same server instance. The connection management module 114 manages the process of closing the open web socket connections in the designated geographical region and reopens the web socket connection in the specified geographical region. The connection management module 114 may take the existing mappings between IP address and server instance into consideration when transferring connections to a new datacenter. For example, at least in some cases, IP addresses that were mapped to the same server instance (e.g., 603 and 605) will be transferred to the same server instance on the new datacenter.

In some cases, closing the open web socket connections in the designated geographical region follows a specific process. In such cases, the open web socket connections are closed with a server-to-client handshake. As part of the server-to-client handshake, a formatted text frame is sent from the server to the client device. In response, the client device sends the server a control (close) frame to close the connection. In other cases, the server sends a control frame to the client that causes the client to close the open web socket connection. Following this process ensures a seamless transfer of web socket connections to different geographical regions while maintaining the stateful nature of the connections and minimizing service disruption.

In addition to the above-described method, a system may be provided that includes at least one physical processor and physical memory comprising computer-executable instructions that, when executed by the physical processor, cause the physical processor to: listen for an evacuation event indicating that network traffic for a designated geographical region is to be transferred to one or more other geographical regions, identify one or more open web socket connections assigned to the specified geographical region, determine, for one or more of the open web socket connections, that the open web socket connections are to be disconnected and transferred to a specified geographical region among the one or more other geographical regions, for those web socket connections that are to be transferred to one of the other geographical regions, schedule, in a disconnection schedule, the open web socket connections for disconnection within a specified time interval, and after a specified amount of time designated by the disconnection schedule, close the open web socket connections in the designated geographical region and reopening the web socket connection in the specified geographical region.

Still further, in addition to the above-described method, a non-transitory computer-readable medium may be provided that includes one or more computer-executable instructions that, when executed by at least one processor of a computing device, cause the computing device to: listen for an evacuation event indicating that network traffic for a designated geographical region is to be transferred to one or more other geographical regions, identify one or more open web socket connections assigned to the specified geographical region, determine, for one or more of the open web socket connections, that the open web socket connections are to be disconnected and transferred to a specified geographical region among the one or more other geographical regions, for those web socket connections that are to be transferred to one of the other geographical regions, schedule, in a disconnection schedule, the open web socket connections for disconnection within a specified time interval, and after a specified amount of time designated by the disconnection schedule, close the open web socket connections in the designated geographical region and reopening the web socket connection in the specified geographical region.

Figure 7:
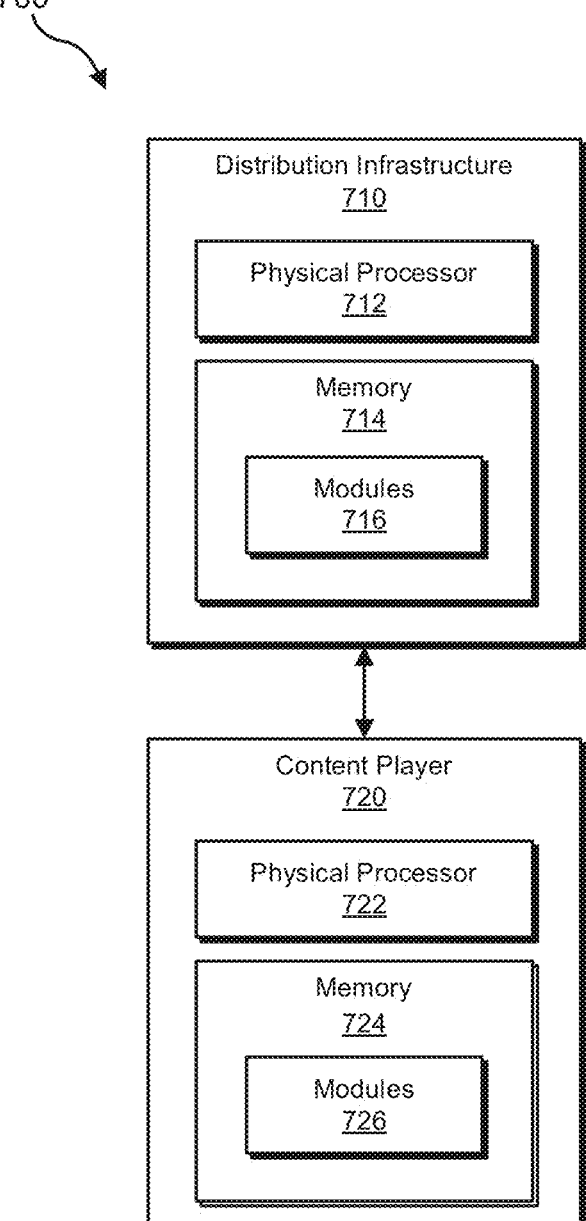
FIG. 7 is a block diagram of an exemplary content distribution ecosystem.
Figure 8:
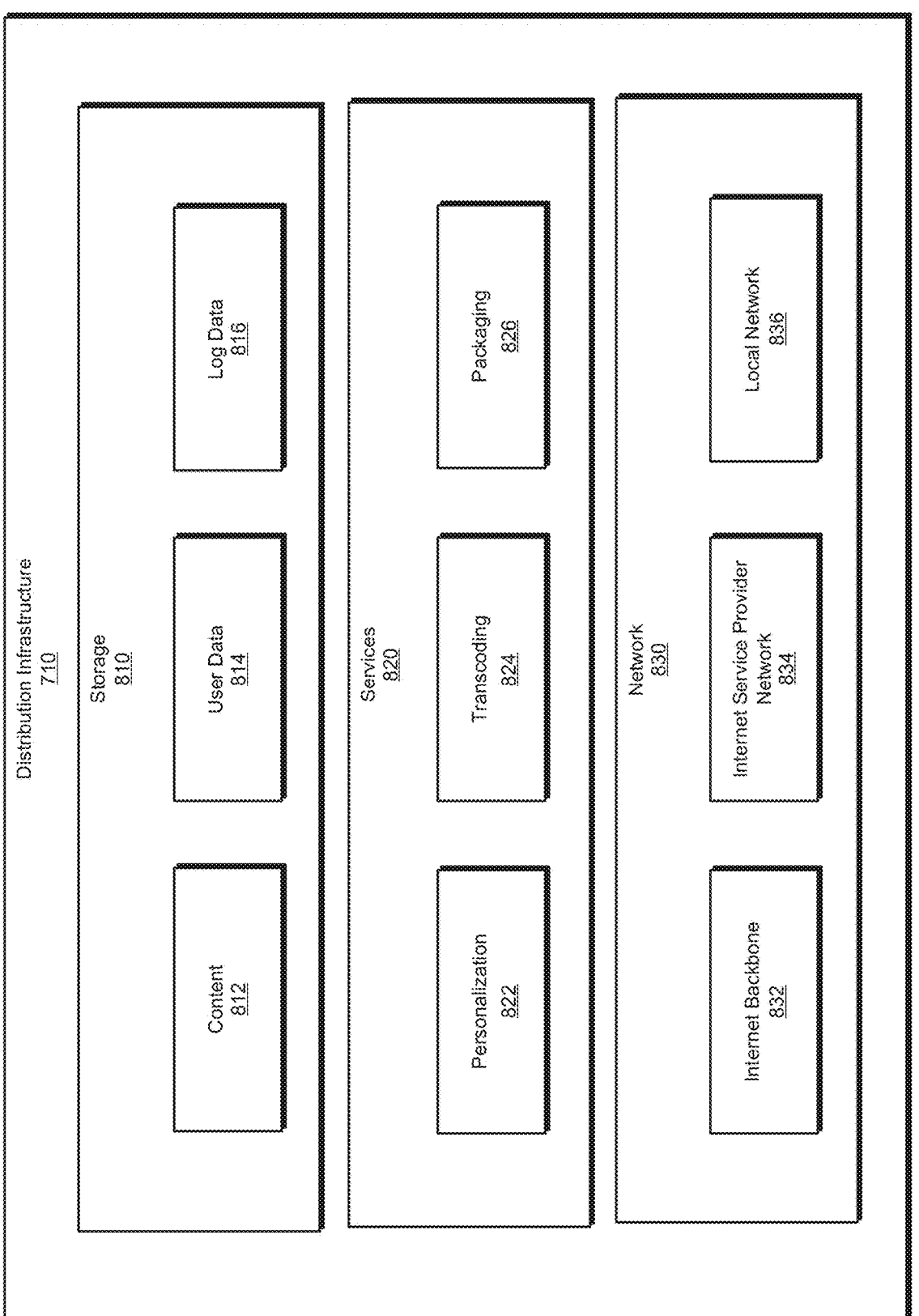
FIG. 8 is a block diagram of an exemplary distribution infrastructure within the content distribution ecosystem shown in FIG. 7.
Figure 9:
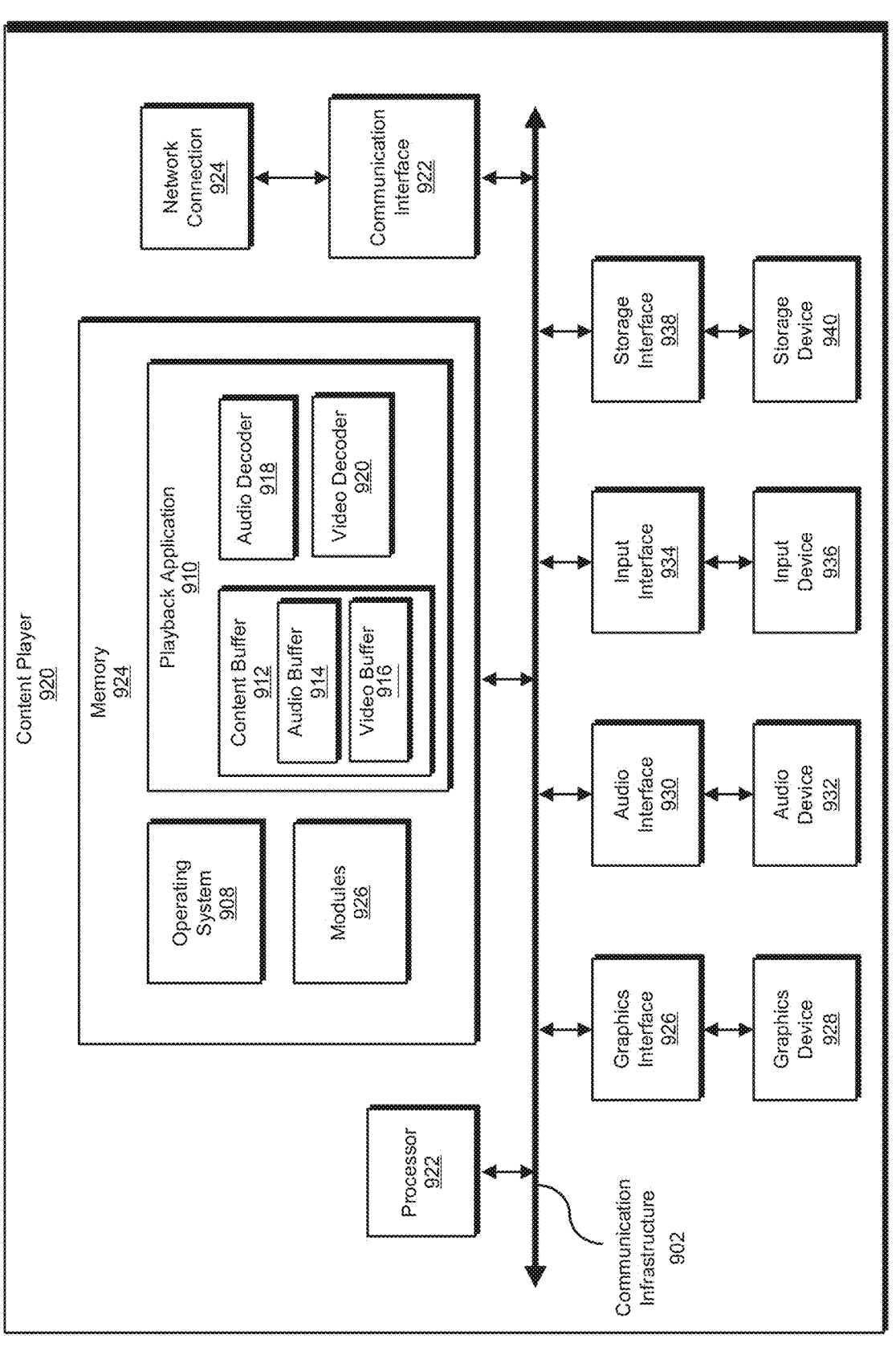
FIG. 9 is a block diagram of an exemplary content player within the content distribution ecosystem shown in FIG. 8.

The following will provide, with reference to FIG. 7, detailed descriptions of exemplary ecosystems in which content is provisioned to end nodes and in which requests for content are steered to specific end nodes. The discussion corresponding to FIGS. 8 and 9 presents an overview of an exemplary distribution infrastructure and an exemplary content player used during playback sessions, respectively. These exemplary ecosystems and distribution infrastructures are implemented in any of the embodiments described above with reference to FIGS. 1-9.

FIG. 7 is a block diagram of a content distribution ecosystem 700 that includes a distribution infrastructure 710 in communication with a content player 720. In some embodiments, distribution infrastructure 710 is configured to encode data at a specific data rate and to transfer the encoded data to content player 720. Content player 720 is configured to receive the encoded data via distribution infrastructure 710 and to decode the data for playback to a user. The data provided by distribution infrastructure 710 includes, for example, audio, video, text, images, animations, interactive content, haptic data, virtual or augmented reality data, location data, gaming data, or any other type of data that is provided via streaming.

Distribution infrastructure 710 generally represents any services, hardware, software, or other infrastructure components configured to deliver content to end users. For example, distribution infrastructure 710 includes content aggregation systems, media transcoding and packaging services, network components, and/or a variety of other types of hardware and software. In some cases, distribution infrastructure 710 is implemented as a highly complex distribution system, a single media server or device, or anything in between. In some examples, regardless of size or complexity, distribution infrastructure 710 includes at least one physical processor 712 and at least one memory 714. One or more modules 716 are stored or loaded into memory 714 to enable adaptive streaming, as discussed herein.

Content player 720 generally represents any type or form of device or system capable of playing audio and/or video content that has been provided over distribution infrastructure 710. Examples of content player 720 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 710, content player 720 includes a physical processor 722, memory 724, and one or more modules 726. Some or all of the adaptive streaming processes described herein is performed or enabled by modules 726, and in some examples, modules 716 of distribution infrastructure 710 coordinate with modules 726 of content player 720 to provide adaptive streaming of digital content.

In certain embodiments, one or more of modules 716 and/or 726 in FIG. 7 represent one or more software applications or programs that, when executed by a computing device, cause the computing device to perform one or more tasks. For example, and as will be described in greater detail below, one or more of modules 716 and 726 represent modules stored and configured to run on one or more general-purpose computing devices. One or more of modules 716 and 726 in FIG. 7 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 712 and 722 generally represent any type or form of hardware-implemented processing unit capable of interpreting and/or executing computer-readable instructions. In one example, physical processors 712 and 722 access and/or modify one or more of modules 716 and 726, respectively. Additionally or alternatively, physical processors 712 and 722 execute one or more of modules 716 and 726 to facilitate adaptive streaming of digital content. Examples of physical processors 712 and 722 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 714 and 724 generally represent any type or form of volatile or non-volatile storage device or medium capable of storing data and/or computer-readable instructions. In one example, memory 714 and/or 724 stores, loads, and/or maintains one or more of modules 716 and 726. Examples of memory 714 and/or 724 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 8 is a block diagram of exemplary components of content distribution infrastructure 710 according to certain embodiments. Distribution infrastructure 710 includes storage 810, services 820, and a network 830. Storage 810 generally represents any device, set of devices, and/or systems capable of storing content for delivery to end users. Storage 810 includes a central repository with devices capable of storing terabytes or petabytes of data and/or includes distributed storage systems (e.g., appliances that mirror or cache content at Internet interconnect locations to provide faster access to the mirrored content within certain regions). Storage 810 is also configured in any other suitable manner.

As shown, storage 810 may store a variety of different items including content 812, user data 814, and/or log data 816. Content 812 includes television shows, movies, video games, user-generated content, and/or any other suitable type or form of content. User data 814 includes personally identifiable information (PII), payment information, preference settings, language and accessibility settings, and/or any other information associated with a particular user or content player. Log data 816 includes viewing history information, network throughput information, and/or any other metrics associated with a user's connection to or interactions with distribution infrastructure 710.

Services 820 includes personalization services 822, transcoding services 824, and/or packaging services 826. Personalization services 822 personalize recommendations, content streams, and/or other aspects of a user's experience with distribution infrastructure 710. Encoding services 824 compress media at different bitrates which, as described in greater detail below, enable real-time switching between different encodings. Packaging services 826 package encoded video before deploying it to a delivery network, such as network 830, for streaming.

Network 830 generally represents any medium or architecture capable of facilitating communication or data transfer. Network 830 facilitates communication or data transfer using wireless and/or wired connections. Examples of network 830 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 8, network 830 includes an Internet backbone 832, an internet service provider 834, and/or a local network 836. As discussed in greater detail below, bandwidth limitations and bottlenecks within one or more of these network segments triggers video and/or audio bit rate adjustments.

FIG. 9 is a block diagram of an exemplary implementation of content player 720 of FIG. 7. Content player 720 generally represents any type or form of computing device capable of reading computer-executable instructions. Content player 720 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 9, in addition to processor 722 and memory 724, content player 720 includes a communication infrastructure 902 and a communication interface 922 coupled to a network connection 924. Content player 720 also includes a graphics interface 926 coupled to a graphics device 928, an input interface 934 coupled to an input device 936, and a storage interface 938 coupled to a storage device 940.

Communication infrastructure 902 generally represents any type or form of infrastructure capable of facilitating communication between one or more components of a computing device. Examples of communication infrastructure 902 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 724 generally represents any type or form of volatile or non-volatile storage device or medium capable of storing data and/or other computer-readable instructions. In some examples, memory 724 stores and/or loads an operating system 908 for execution by processor 722. In one example, operating system 908 includes and/or represents software that manages computer hardware and software resources and/or provides common services to computer programs and/or applications on content player 720.

Operating system 908 performs various system management functions, such as managing hardware components (e.g., graphics interface 926, audio interface 930, input interface 934, and/or storage interface 938). Operating system 908 also provides process and memory management models for playback application 910. The modules of playback application 910 includes, for example, a content buffer 912, an audio decoder 918, and a video decoder 920.

Playback application 910 is configured to retrieve digital content via communication interface 922 and play the digital content through graphics interface 926. Graphics interface 926 is configured to transmit a rendered video signal to graphics device 928. In normal operation, playback application 910 receives a request from a user to play a specific title or specific content. Playback application 910 then identifies one or more encoded video and audio streams associated with the requested title. After playback application 910 has located the encoded streams associated with the requested title, playback application 910 downloads sequence header indices associated with each encoded stream associated with the requested title from distribution infrastructure 710. A sequence header index associated with encoded content includes information related to the encoded sequence of data included in the encoded content.

In one embodiment, playback application 910 begins downloading the content associated with the requested title by downloading sequence data encoded to the lowest audio and/or video playback bitrates to minimize startup time for playback. The requested digital content file is then downloaded into content buffer 912, which is configured to serve as a first-in, first-out queue. In one embodiment, each unit of downloaded data includes a unit of video data or a unit of audio data. As units of video data associated with the requested digital content file are downloaded to the content player 720, the units of video data are pushed into the content buffer 912. Similarly, as units of audio data associated with the requested digital content file are downloaded to the content player 720, the units of audio data are pushed into the content buffer 912. In one embodiment, the units of video data are stored in video buffer 916 within content buffer 912 and the units of audio data are stored in audio buffer 914 of content buffer 912.

A video decoder 920 reads units of video data from video buffer 916 and outputs the units of video data in a sequence of video frames corresponding in duration to the fixed span of playback time. Reading a unit of video data from video buffer 916 effectively de-queues the unit of video data from video buffer 916. The sequence of video frames is then rendered by graphics interface 926 and transmitted to graphics device 928 to be displayed to a user.

An audio decoder 918 reads units of audio data from audio buffer 914 and outputs the units of audio data as a sequence of audio samples, generally synchronized in time with a sequence of decoded video frames. In one embodiment, the sequence of audio samples is transmitted to audio interface 930, which converts the sequence of audio samples into an electrical audio signal. The electrical audio signal is then transmitted to a speaker of audio device 932, which, in response, generates an acoustic output.

In situations where the bandwidth of distribution infrastructure 710 is limited and/or variable, playback application 910 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 926 is configured to generate frames of video data and transmit the frames of video data to graphics device 928. In one embodiment, graphics interface 926 is included as part of an integrated circuit, along with processor 722. Alternatively, graphics interface 926 is configured as a hardware accelerator that is distinct from (i.e., is not integrated within) a chipset that includes processor 722.

Graphics interface 926 generally represents any type or form of device configured to forward images for display on graphics device 928. For example, graphics device 928 is fabricated using liquid crystal display (LCD) technology, cathode-ray technology, and light-emitting diode (LED) display technology (either organic or inorganic). In some embodiments, graphics device 928 also includes a virtual reality display and/or an augmented reality display. Graphics device 928 includes any technically feasible means for generating an image for display. In other words, graphics device 928 generally represents any type or form of device capable of visually displaying information forwarded by graphics interface 926.

As illustrated in FIG. 9, content player 720 also includes at least one input device 936 coupled to communication infrastructure 902 via input interface 934. Input device 936 generally represents any type or form of computing device capable of providing input, either computer or human generated, to content player 720. Examples of input device 936 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 720 also includes a storage device 940 coupled to communication infrastructure 902 via a storage interface 938. Storage device 940 generally represents any type or form of storage device or medium capable of storing data and/or other computer-readable instructions. For example, storage device 940 is a magnetic disk drive, a solid-state drive, an optical disk drive, a flash drive, or the like. Storage interface 938 generally represents any type or form of interface or device for transferring data between storage device 940 and other components of content player 720.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example Embodiments

Example 1: A computer-implemented method comprising: listening for an evacuation event indicating that network traffic for a designated geographical region is to be transferred to one or more other geographical regions, identifying one or more open web socket connections assigned to the designated geographical region, determining, for one or more of the open web socket connections, that the open web socket connections are to be disconnected and transferred to a specified geographical region among the one or more other geographical regions, for those web socket connections that are to be transferred to one of the other geographical regions, scheduling, in a disconnection schedule, the open web socket connections for disconnection within a specified time interval, and after a specified amount of time designated by the disconnection schedule, closing the open web socket connections in the designated geographical region and reopening the web socket connection in the specified geographical region.

Example 2. The computer-implemented method of Example 1, wherein scheduling the open web socket connections for disconnection within a specified time interval includes applying a random jitter that closes the open web socket connections after a randomly selected amount of time that is within the specified time interval.

Example 3. The computer-implemented method of Example 1 or Example 2, wherein determining that the open web socket connections are to be disconnected and transferred to a specified geographical region among the one or more other geographical regions includes determining a specified percentage of open web socket connections that are to be transferred.

Example 4. The computer-implemented method of any of Examples 1-3, wherein the open web socket connections that are to be transferred to one of the other geographical regions comprise web socket connections that are part of the specified percentage.

Example 5. The computer-implemented method of any of Examples 1-4, wherein the web socket connections that are to be transferred to one of the other geographical regions are assigned to the other geographical regions to maximize at least one of latency or load balancing among the other geographical regions.

Example 6. The computer-implemented method of any of Examples 1-5, wherein the web socket connection reconnects to the designated geographical region and is proxied to one of the other geographical regions.

Example 7. The computer-implemented method of any of Examples 1-6, wherein domain name system (DNS) names for the specified geographical region are updated while the web socket connections are being proxied.

Example 8. The computer-implemented method of any of Examples 1-7, wherein when web socket connections reconnect to the specified geographical region, the web socket connections are redirected to one of the other geographical regions without being proxied.

Example 9. The computer-implemented method of any of Examples 1-8, wherein identifying the one or more open web socket connections assigned to the specified geographical region includes walking through a table of web socket connections that links IP addresses and web server instances.

Example 10. The computer-implemented method of any of Examples 1-9, wherein closing the open web socket connections in the designated geographical region includes closing the open web socket connections with a server-to-client handshake.

Example 11. The computer-implemented method of any of Examples 1-10, further comprising, as part of the server-to-client handshake, sending a formatted text frame to the client device, wherein the formatted text frame initiates a request to receive a control frame from the server.

Example 12. The computer-implemented method of any of Examples 1-11, further comprising, based on the request, sending a control frame that causes the client to close the open web socket connection.

Example 13. A system comprising at least one physical processor and physical memory comprising computer-executable instructions that, when executed by the physical processor, cause the physical processor to: listen for an evacuation event indicating that network traffic for a designated geographical region is to be transferred to one or more other geographical regions, identify one or more open web socket connections assigned to the designated geographical region, determine, for one or more of the open web socket connections, that the open web socket connections are to be disconnected and transferred to a specified geographical region among the one or more other geographical regions, for those web socket connections that are to be transferred to one of the other geographical regions, schedule, in a disconnection schedule, the open web socket connections for disconnection within a specified time interval, and after a specified amount of time designated by the disconnection schedule, close the open web socket connections in the designated geographical region and reopening the web socket connection in the specified geographical region.

Example 14. The system of Example 13, wherein web socket connections fail over to hypertext transfer protocol (HTTP) if the web socket connection fails.

Example 15. The system of Example 14, wherein at least one of the web socket connections is restored to the designated geographical region.

Example 16. The system of Example 14 or Example 15, wherein determining that the open web socket connections are to be disconnected and transferred to a specified geographical region among the one or more other geographical regions includes determining a specified percentage of open web socket connections that are to be transferred.

Example 17. The system of any of Examples 14-16, wherein the open web socket connections that are to be transferred to one of the other geographical regions comprise web socket connections that are part of the specified percentage.

Example 18. The system of Examples 14-17, wherein the web socket connections that are to be transferred to one of the other geographical regions are assigned to the other geographical regions to maximize at least one of latency or load balancing among the other geographical regions.

Example 19. The system of any of Examples 14-18, wherein the open web socket connections are open for at least one hour.

Example 20. A non-transitory computer-readable medium comprising one or more computer-executable instructions that, when executed by at least one processor of a computing device, cause the computing device to: listen for an evacuation event indicating that network traffic for a designated geographical region is to be transferred to one or more other geographical regions, identify one or more open web socket connections assigned to the designated geographical region, determine, for one or more of the open web socket connections, that the open web socket connections are to be disconnected and transferred to a specified geographical region among the one or more other geographical regions, for those web socket connections that are to be transferred to one of the other geographical regions, schedule, in a disconnection schedule, the open web socket connections for disconnection within a specified time interval, and after a specified amount of time designated by the disconnection schedule, close the open web socket connections in the designated geographical region and reopening the web socket connection in the specified geographical region.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

listening for an evacuation event indicating that network traffic for a designated geographical region is to be transferred to one or more other geographical regions;

identifying one or more open web socket connections assigned to the designated geographical region;

determining, for one or more of the open web socket connections, that the open web socket connections are to be disconnected and transferred to a specified geographical region among the one or more other geographical regions;

for those web socket connections that are to be transferred to one of the other geographical regions, scheduling, in a disconnection schedule, the open web socket connections for disconnection within a specified time interval; and after a specified amount of time designated by the disconnection schedule, closing the open web socket connections in the designated geographical region and reopening the web socket connection in the specified geographical region.

2. The computer-implemented method of claim 1, wherein scheduling the open web socket connections for disconnection within a specified time interval includes applying a random jitter that closes the open web socket connections after a randomly selected amount of time that is within the specified time interval.

3. The computer-implemented method of claim 1, wherein determining that the open web socket connections are to be disconnected and transferred to a specified geographical region among the one or more other geographical regions includes determining a specified percentage of open web socket connections that are to be transferred.

4. The computer-implemented method of claim 3, wherein the open web socket connections that are to be transferred to one of the other geographical regions comprise web socket connections that are part of the specified percentage.

5. The computer-implemented method of claim 1, wherein the web socket connections that are to be transferred to one of the other geographical regions are assigned to the other geographical regions to maximize at least one of latency or load balancing among the other geographical regions.

6. The computer-implemented method of claim 1, wherein the web socket connection reconnects to the designated geographical region and is proxied to one of the other geographical regions.

7. The computer-implemented method of claim 6, wherein domain name system (DNS) names for the specified geographical region are updated while the web socket connections are being proxied.

8. The computer-implemented method of claim 7, wherein when web socket connections reconnect to the specified geographical region, the web socket connections are redirected to one of the other geographical regions without being proxied.

9. The computer-implemented method of claim 1, wherein identifying the one or more open web socket connections assigned to the specified geographical region includes walking through a table of web socket connections that links IP addresses and web server instances.

10. The computer-implemented method of claim 1, wherein closing the open web socket connections in the designated geographical region includes closing the open web socket connections with a server-to-client handshake.

11. The computer-implemented method of claim 10, further comprising, as part of the server-to-client handshake, sending a formatted text frame to a client device, wherein the formatted text frame initiates a request to receive a control frame from the server.

12. The computer-implemented method of claim 11, further comprising, based on the request, sending a control frame that causes the client to close the open web socket connection.

13. A system comprising:

at least one physical processor;

an electronic display; and physical memory comprising computer-executable instructions that, when executed by the physical processor, cause the physical processor to:

listen for an evacuation event indicating that network traffic for a designated geographical region is to be transferred to one or more other geographical regions;

identify one or more open web socket connections assigned to the designated geographical region;

determine, for one or more of the open web socket connections, that the open web socket connections are to be disconnected and transferred to a specified geographical region among the one or more other geographical regions;

for those web socket connections that are to be transferred to one of the other geographical regions, schedule, in a disconnection schedule, the open web socket connections for disconnection within a specified time interval; and after a specified amount of time designated by the disconnection schedule, close the open web socket connections in the designated geographical region and reopening the web socket connection in the specified geographical region.

14. The system of claim 13, wherein web socket connections fail over to hypertext transfer protocol (HTTP) if the web socket connection fails.

15. The system of claim 13, wherein at least one of the web socket connections is restored to the designated geographical region.

16. The system of claim 13, wherein determining that the open web socket connections are to be disconnected and transferred to a specified geographical region among the one or more other geographical regions includes determining a specified percentage of open web socket connections that are to be transferred.

17. The system of claim 16, wherein the open web socket connections that are to be transferred to one of the other geographical regions comprise web socket connections that are part of the specified percentage.

18. The system of claim 13, wherein the web socket connections that are to be transferred to one of the other geographical regions are assigned to the other geographical regions to maximize at least one of latency or load balancing among the other geographical regions.

19. The system of claim 18, wherein the open web socket connections are open for at least one hour.

20. A non-transitory computer-readable medium comprising one or more computer-executable instructions that, when executed by at least one processor of a computing device, cause the computing device to:

listen for an evacuation event indicating that network traffic for a designated geographical region is to be transferred to one or more other geographical regions;

identify one or more open web socket connections assigned to the designated geographical region;

determine, for one or more of the open web socket connections, that the open web socket connections are to be disconnected and transferred to a specified geographical region among the one or more other geographical regions;

for those web socket connections that are to be transferred to one of the other geographical regions, schedule, in a disconnection schedule, the open web socket connections for disconnection within a specified time interval; and after a specified amount of time designated by the disconnection schedule, close the open web socket connections in the designated geographical region and reopening the web socket connection in the specified geographical region.

\* \* \* \* \*